(12) United States Patent
Kashiwada

(10) Patent No.: US 7,448,083 B2
(45) Date of Patent: Nov. 4, 2008

(54) SECURITY APPARATUS AND COMPUTER PRODUCT

(75) Inventor: Takeshi Kashiwada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 662 days.

(21) Appl. No.: 10/108,370

(22) Filed: Mar. 29, 2002

(65) Prior Publication Data

US 2002/0108053 A1 Aug. 8, 2002

Related U.S. Application Data

(63) Continuation of application No. PCT/JP99/06564, filed on Nov. 25, 1999.

(51) Int. Cl.
*G06F 7/04* (2006.01)

(52) U.S. Cl. .............. 726/23; 726/22; 705/51; 705/52; 705/53; 705/54; 713/189; 713/190; 713/191; 713/192; 713/193

(58) Field of Classification Search ............... 726/22, 726/23, 24, 25
See application file for complete search history.

(56) References Cited

U.S. PATENT DOCUMENTS 5,144,660 A * 9/1992 Rose ........................... 726/24
5,845,069 A * 12/1998 Tanaka ......................... 726/20
6,480,096 B1 * 11/2002 Gutman et al. .............. 340/5.31

FOREIGN PATENT DOCUMENTS

| | | |
|---|---|---|
| EP | 0 923 057 | 6/1999 |
| GB | 2 329 499 | 3/1999 |
| JP | 63-123184 | 5/1988 |
| JP | 64-13691 | 1/1989 |
| JP | 4-199246 | 7/1992 |
| JP | 8-44805 | 2/1996 |
| JP | 3023788 | 2/1996 |
| JP | 8-339407 | 12/1996 |
| JP | 10-69434 | 3/1998 |
| JP | 10-69435 | 3/1998 |
| JP | 11-154140 | 6/1999 |
| JP | 11-167599 | 6/1999 |

* cited by examiner

*Primary Examiner*—Kambiz Zand
*Assistant Examiner*—Roderick Tolentino
(74) *Attorney, Agent, or Firm*—Kratz, Quintos & Hanson, LLP.

(57) ABSTRACT

The security apparatus comprises a memory unit which stores data that is a target of security; a CPU which counts the number of processing relating to the secret data as processing access count data, and counts the number of times the processing access count data is updated by outside causes as monitor count data. The processing access count data has exceeded a preset processing access count threshold, the CPU restricts subsequent processing, and, when the monitor count data has exceeded a preset monitor count threshold, the CPU restricts subsequent processing.

7 Claims, 13 Drawing Sheets

FIG.5

| ACCESS FROM CPU12 | | OPERATION |
|---|---|---|
| ADDRESS | READ/WRITE PARTITION | |
| 0000H~ 0FFFH | READ/WRITE | OPERATION OF READING/WRITING RELATING TO THE MEMORY SECTION 21 AND COUNT-UP OF PROCESSING ACCESS COUNTER 22 |
| 1000H~ 100FH | READ/WRITE | OPERATION OF READING/WRITING RELATING TO THE PROCESSING ACCESS COUNTER 22 AND COUNT-UP OF THE MONITOR COUNTER 23 |
| 2000H~ 200FH | READ | READ OPERATION RELATING TO THE MONITOR COUNTER 23 |
| | WRITE | WRITE OPERATION RELATING TO THE MONITOR COUNTER 23 AND DELETION OF ALL DATA IN THE MEMORY SECTION 21 |

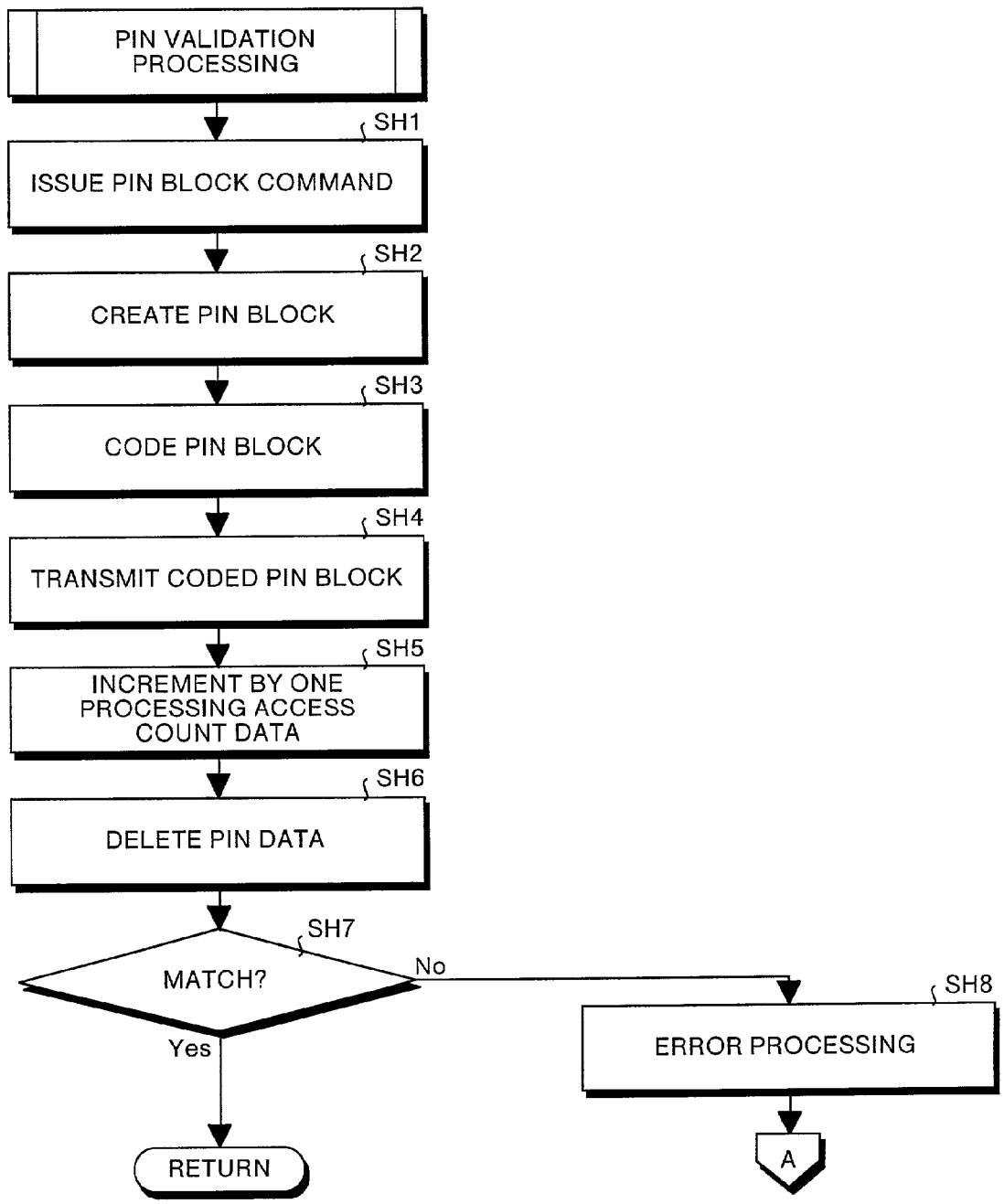

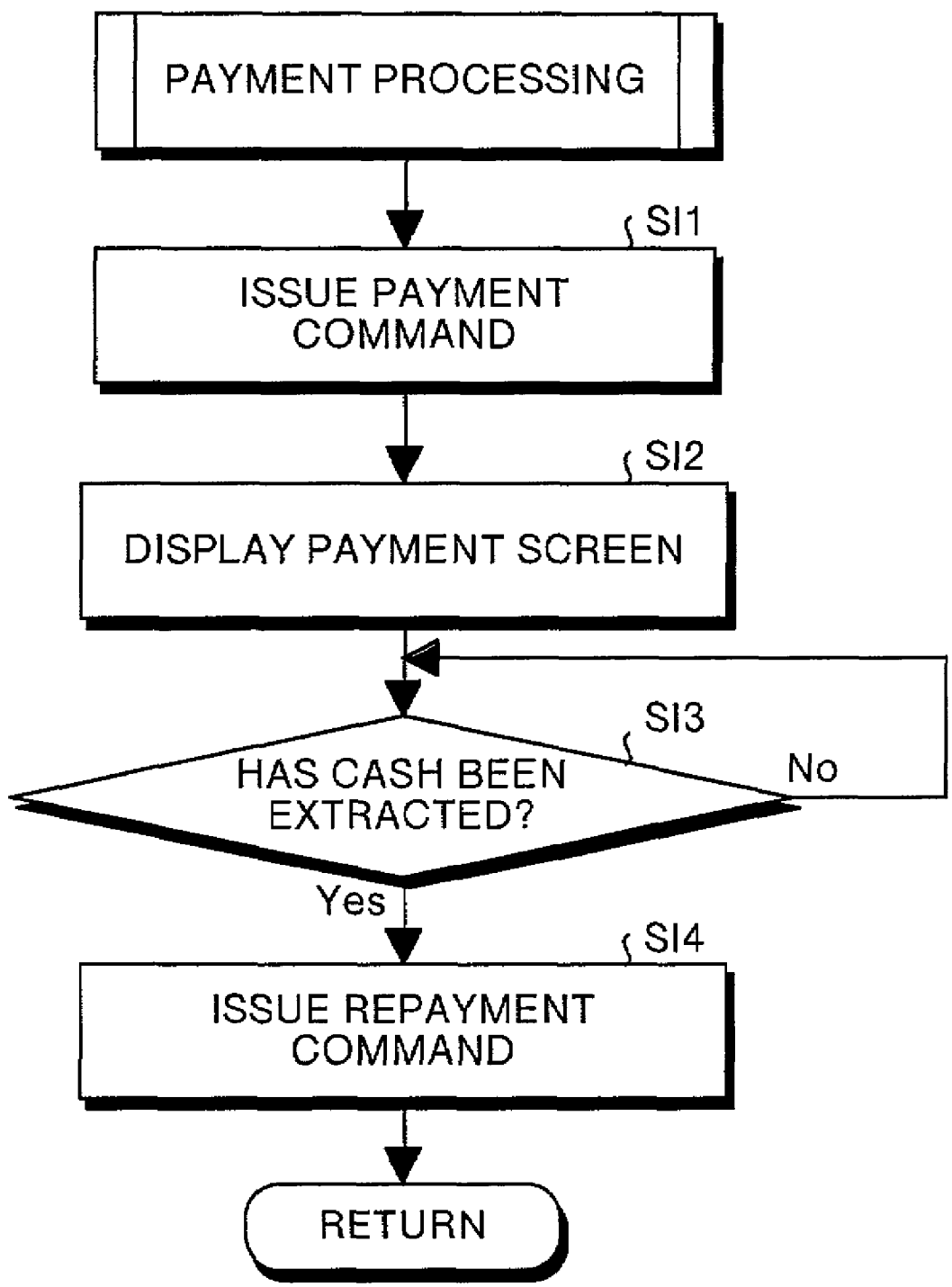

SECURITY APPARATUS AND COMPUTER PRODUCT

This application is a continuation of international application PCT/JP99/06564 filed on Nov. 25, 1999.

TECHNICAL FIELD

The present invention relates to a security apparatus which prevents an unauthorized third party from illegally obtaining secret data, such as personal identification number and code keys, and a computer-readable recording medium in which a security program is stored.

BACKGROUND ART

Conventionally, secret data is kept in a security apparatus which prevents it from being illegally obtained by a third party, and is processed inside the security apparatus. However, the unauthorized third party attempts to illegally obtain the secret data by using various units and methods. For instance, the unauthorized third party tries accessing the security apparatus to obtain indirect data with little security which indirectly relates to the secret data, and obtains the secret data by systematically using the indirect data. Thus there is a conventional demand for units and methods which can effectively prevent an unauthorized third party from illegally obtaining secret data.

Japanese Patent Application Laid-Open Nos. 8-44805 and 63-123184 disclose technology relating to a security apparatus which counts the number of time secret data is accessed by using a counter, and deletes the secret data when the access number has exceeded a threshold, thereby preventing an unauthorized third party from illegally obtaining the secret data.

Furthermore, conventionally, as a method of maintaining security, there is a method of requesting input of a code number when executing a predetermined process, and restricting the process when the validation result of the code number has exceeded a threshold.

Nevertheless, in conventional security apparatuses such as that described above, when the interface with outside apparatuses becomes clear, it becomes possible to frequently execute processing to obtain indirect information relating to the secret information. Accordingly, conventionally, illegally obtaining of the secret data is prevented by deleting the secret data, based on a comparison result between the counter result (number of accesses) of the counter and a threshold.

However, in conventional security apparatuses, there are cases in which the unauthorized third party can clear the counter result before it reaches the threshold, as a result of a breakdown in the interface and the like. In this case, since the indirect information is obtained without restrictions, there is a problem that illegally obtaining of secret information is easily tolerated.

Therefore, it is an object of the present invention to provide a security apparatus capable of increasing security relating to illegally obtaining of secret data, and to a computer-readable recording medium which security programs are stored in.

DISCLOSURE OF THE INVENTION

The security apparatus according to the present invention comprises a storing unit (corresponding to a memory section 17, a memory section 21, and a memory section 42 in subsequently described first to third embodiments) which stores data that is a target of security, a first counting unit (corresponding to a control section 41, a processing access count data storage region 17b, a processing access counter 22, and a processing access count data storage region 42c in subsequently described first to third embodiments) which counts the number of processing relating to the secret data, a first restricting unit (corresponding to the CPU 12 and a control section 31 in subsequently described first to third embodiments) which restricts subsequent processing when a first count result of the first counting unit has exceeded a preset first count threshold, a second counting unit (corresponding to the CPU 12, the control section 41, the monitor count data storage region 17c, a monitor counter 23, and the monitor count data storage region 42d in subsequently described first to third embodiments) which counts the number of times the first counting unit is updated by outside causes, and which cannot be cleared from the outside, and a second restricting unit (corresponding to the CPU 12 and the control section 31 in the subsequently described first to third embodiments) which restricts subsequent processing when a second count result of the second counting unit has exceeded a preset second count threshold.

According to this invention, when a third party uses an unauthorized unit to illegally obtain secret data, he must perform an abnormal number of processes. In this case, the first counter counts the number of all the processes performed in the illegal obtaining, and, when the first count result exceeds the first threshold, the first restricting unit restricts subsequent processing, thereby preventing the unauthorized party from illegally obtaining the secret data.

Accordingly, the third party attempts to illegally obtain the secret data by using an unauthorized unit to repeat the operation of updating the first count value to a smaller value than the threshold before the first count value reaches the threshold. At this time, the second counting unit counts the number of times the first count value is updated. Then, when the second count result of the second counting unit exceeds a second threshold, the second restricting unit restricts subsequent processing, thereby preventing the unauthorized party from illegally obtaining the secret data.

Thus, according to this invention, in addition to the first counting unit, the second counting unit, which counts the number of times the first counter value is updated, is provided, and, based on the second count result of the second counting unit, processing relating to secret data is restricted, therefore, security relating to the illegal obtaining of the secret data can be increased more than in a conventional apparatus.

Furthermore, in the security apparatus, the first restricting unit deletes the secret data, stored in the storing unit, when the first count result has exceeded the preset second threshold.

When a third party uses an unauthorized unit to perform processing relating to secret data with the aim of illegally obtaining the secret data, at the point where the first count result has exceeded the first threshold, the first restricting unit deletes the secret data. Therefore, the third party cannot achieve his initial aim of illegally obtaining the secret data. Furthermore, in this case, the fact that an unauthorized act has been committed remains as history based on the first counting result.

In this way, according to this invention, since the first restricting unit deletes the secret data which is the target of the illegal obtaining, security relating to the illegal obtaining of the secret data can be increased more than in a conventional apparatus.

Furthermore, in the security apparatus, the second restricting unit deletes the secret data, stored in the storing unit, when the second count result has exceeded the preset second threshold.

When a third party uses an unauthorized unit to update the first count data with the aim of illegally obtaining the secret data, at the point where the second count result has exceeded the second threshold, the second restricting unit deletes the secret data. Therefore, the third party cannot achieve his initial aim of illegally obtaining the secret data. Furthermore, in this case, the fact that an unauthorized act has been committed remains as history based on the first counting result.

In this way, according to this invention, since the second restricting unit deletes the secret data which is the target of the illegal obtaining, security relating to the illegal obtaining of the secret data can be increased more than in a conventional apparatus.

Furthermore, the security apparatus comprises a clearing unit which clears the first count result at predetermined time intervals.

Since the clearing unit clears the first count result at predetermined time intervals, when the number of processes relating to the secret data by a person having legitimate right has exceeded the first threshold, the unnecessary deletion of secret data can be avoided.

Furthermore, the computer-readable recording medium according to the present invention stores a security program that makes a computer to execute a holding step (corresponding to step SA1 in the first embodiment explained later) of holding data that is a target of security, a first counting step (corresponding to step SB1 in the first embodiment explained later) of counting the number of processing relating to the secret data, a first restricting step (corresponding to step SB6 in the first embodiment explained later) of restricting subsequent processing when a first count value of the first counting step has exceeded a preset first count threshold, a second counting step (corresponding to step SA17, step SA20, and step SB7 in the first embodiment explained later) of counting the number of times the first count value is updated by outside causes, and which cannot be cleared from the outside, and a second restricting step of restricting subsequent processing when a second count result of the second counting step has exceeded a preset second count threshold.

According to this invention, when a third party uses an unauthorized unit to illegally obtain secret data, he must perform an abnormal number of processes. In this case, the first counter step counts the number of all the processes performed in the illegal obtaining, and, when the first count result exceeds the first threshold, the first restricting step restricts subsequent processing, thereby preventing the unauthorized party from illegally obtaining the secret data.

Accordingly, the third party attempts to illegally obtain the secret data by using an unauthorized unit to repeat the operation of updating the first count value to a smaller value than the threshold before the first count value reaches the threshold. At this time, the second counting step counts the number of times the first count value is updated. Then, when the second count result of the second counting step exceeds a second threshold, the second restricting step restricts subsequent processing, thereby preventing the unauthorized party from illegally obtaining the secret data.

Thus, according to this invention, in addition to the first counting step there is provided the second counting step of counting the number of times the first counter value is updated, and, based on the second count result of the second counting step, processing relating to secret data is restricted, therefore, security relating to the illegal obtaining of the secret data can be increased more than in a conventional apparatus.

BRIEF DESCRIPTION OF THE DRAWINGS

FIG. 5 is a flowchart showing the operation of the second embodiment;

FIG. 12 is a flow chart showing PIN validation processing shown in FIG. 10; and

FIG. 13 is a flow chart showing payment processing shown in FIG. 7.

BEST MODE FOR CARRYING OUT THE INVENTION

The present invention will be explained in detail in compliance with the accompanying drawings.

Figure 1:
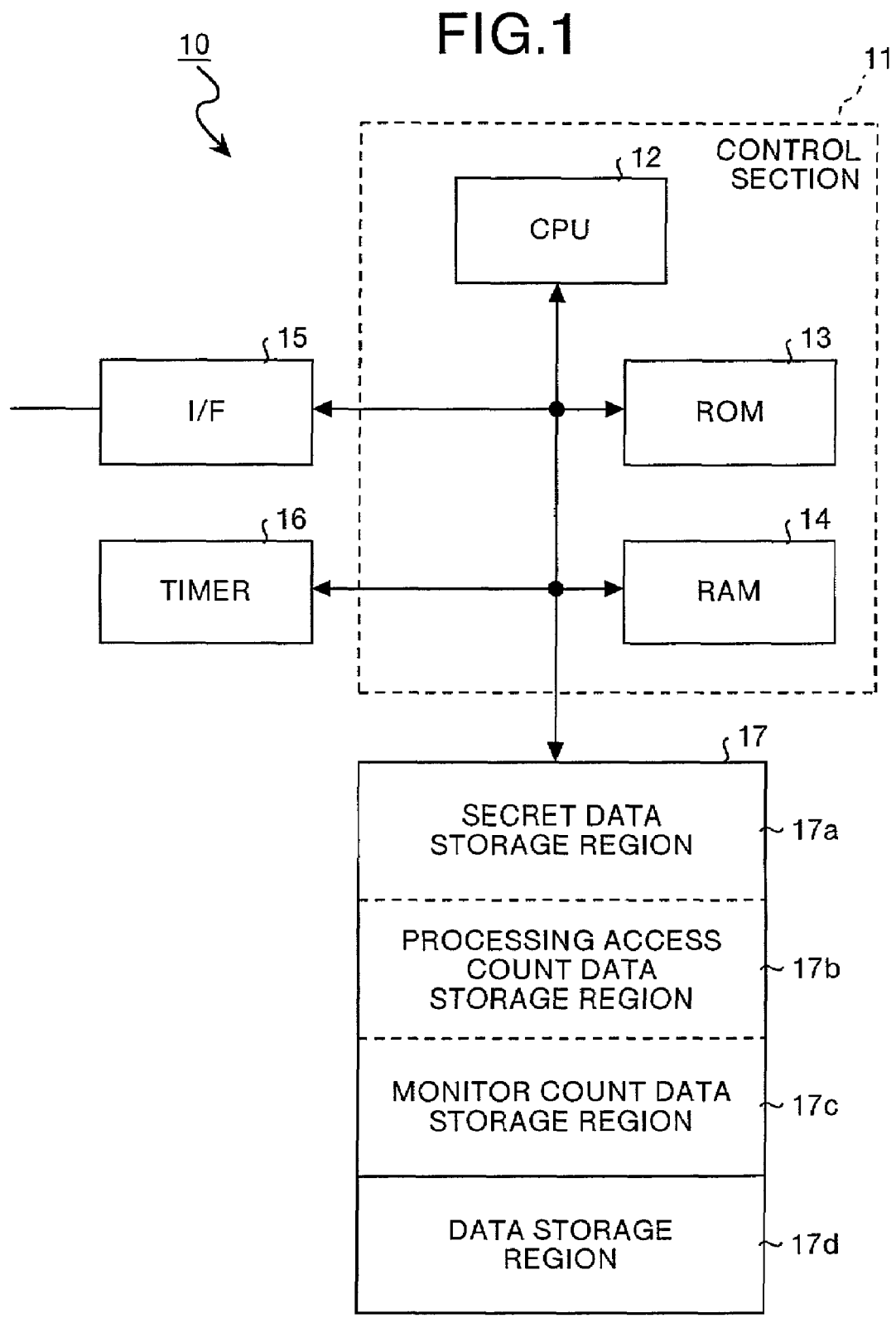
FIG. 1 is a block diagram showing the constitution of a first embodiment according to the present invention.

FIG. 1 is a block diagram showing the constitution of a first embodiment of the present invention. A security apparatus 10 shown in FIG. 1 holds secret data (e.g. code key data), and performs code processing (coding processing, decoding processing, and the like) by using data input from the outside and the above-mentioned secret data. The security apparatus 10 is equipped with a security function of protecting secret data from unauthorized access from the outside.

In the security apparatus 10, a control section 11 executes various types of processing relating to the secret data in compliance with commands, input thereto from the outside. The control section 11 comprises a CPU (central processing unit) 12, an ROM (read only memory) 13, and an RAM (random access memory) 14. The CPU 12 executes programs which are stored in the ROM 13, and thereby controls the sections. Incidentally, the operation of the CPU 12 will be explained in detail later.

The ROM 13 is a nonvolatile memory. The RAM 14 is a volatile memory, data stored therein being destroyed when the power is cut off, and momentarily stores various types of data under the control of the CPU 12. An I/F (interface) 15 is for example an RS232C, and exchanges various types of command and various types of data between the CPU 12 and not-shown outside devices. A timer 16 measures time under the control of the CPU 12.

A memory section 17 stores the secret data, processing access count data, monitor count data, and other data. Furthermore, a secret data storage region 17a, which secret data is stored in, a processing access count data storage region 17b, which processing access count data is stored in, a monitor count data storage region 17c, which monitor count data is stored in, and a data storage region 17d, which other data are stored in, are stored in the memory section 17.

The secret data is code key data, used for example as a key when performing code processing (coding and decoding). The processing access count data is data representing the number ("processing access number") of accesses of secret data from processing relating to the secret data and the outside, and is incremented or cleared by one and cleared by the CPU 12. That is, the processing access count data storage region 17b functions as a processing access counter which counts the processing access number under the control of the CPU 12.

Furthermore, the monitor count data is data representing the number of times some kind of processing is performed to the processing access count data (processing access counter), such as reading, writing, and updating the processing access count data. In this way, under the control of the CPU 12, the monitor count data storage region 17c functions as a monitor counter which counts the number of times some kind of processing is performed to the processing access count data (processing access counter).

Figure 2:
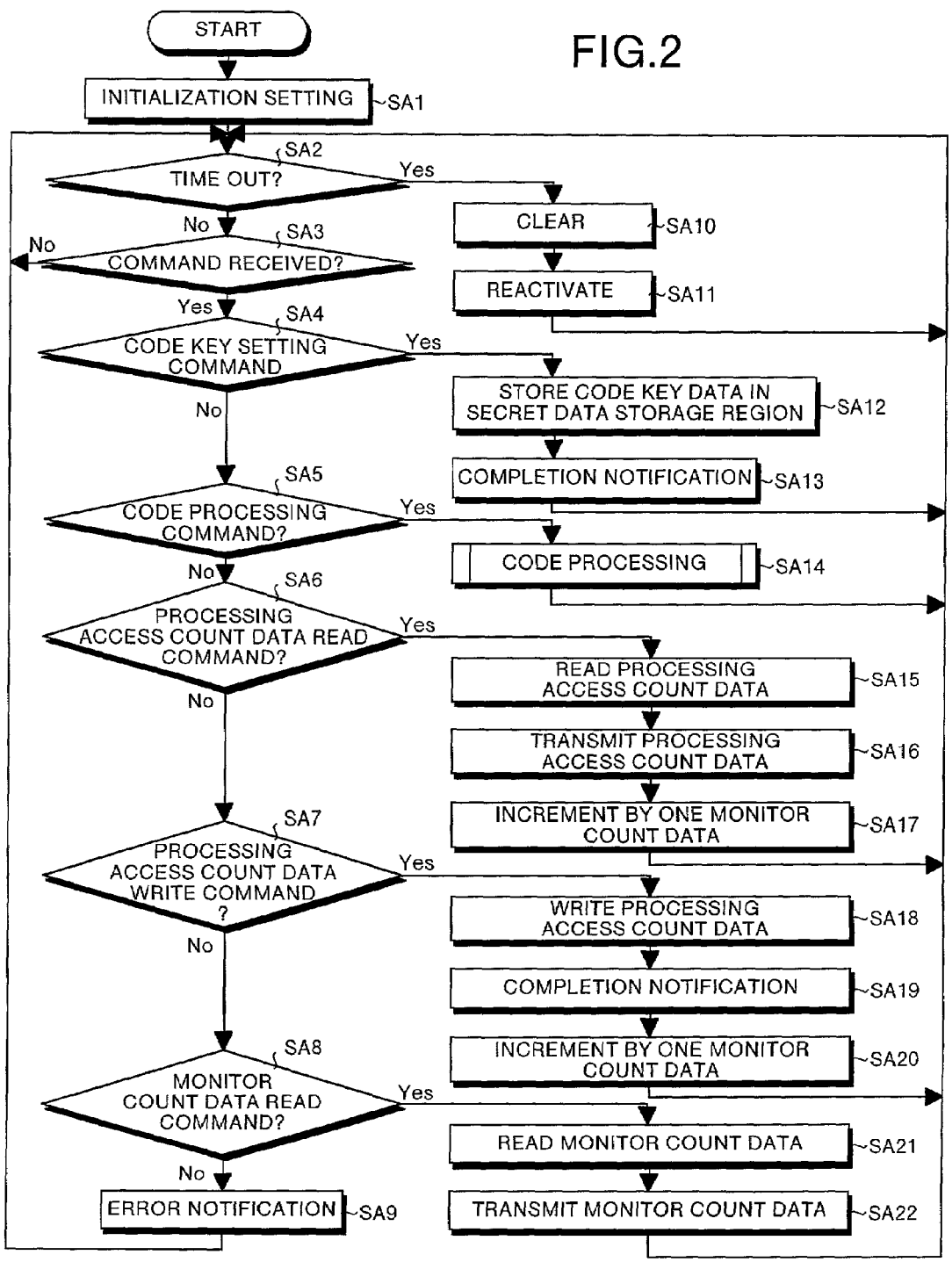
FIG. 2 is a flowchart showing the operation of the first embodiment.

Subsequently, the operation of the first embodiment will be explained with reference to the flowcharts shown in FIGS. 2 and 3. In the security apparatus 10 shown in FIG. 1, when the power is switched on, at step SA1 shown in FIG. 2, the CPU 12 performs setting to activate the I/F 15, and, after a timer 16 has been activated, executes step SA2.

At step SA2, the CPU 12 determines whether the count result of the timer 16 has exceeded a preset timer threshold, that is, whether it has timed out, in this case, the determination result is "No" and the CPU 12 executes step SA3. At step SA3, the CPU 12 determines whether a command has been received via the I/F 15 from an outside apparatus, in this case, the determination result is "No" and the CPU 12 returns to step SA2 and repeats the operation described above.

When the count result of the timer 16 reaches the timer threshold, the CPU 12 makes a determination result of "Yes" at step SA2, and executes step SA10. At step SA10, the CPU 12 overwrites the processing access count data (=0) in the processing access count data storage region 17b, and, after clearing the processing access counter data, executes step SA11. That is, at step SA10, the processing access count is cleared. At step SA11, the CPU 12 reactivates the timer 16, returns to step SA2 to repeat the operation described above.

WWhen the outside apparatus (not-shown) issues a code key command to the CPU 12, and the code key data is transmitted to the CPU 12, the code key set command and code key data are received via the I/F 15 at the CPU 12. Consequently, the CPU 12 determines "Yes" at step SA3 and executes step SA4. At step SA4, the CPU 12 determines whether the command received at step SA3 is a code key set command, and in this case determines "Yes" and executes step SA12.

At step SA12, the CPU 12 stores the received code key data in the secret data storage region 17a, and executes step SA13. At step SA13, the CPU 12 notifies the outside apparatus via the I/F 15 that the storing of the code key data has been completed, returns to step SA2 and repeats the operation described above.

When the outside apparatus issues a code processing command to the CPU 12, and the code processed data is transmitted to the CPU 12, the code processing data and code processed data are received via the I/F 15 at the CPU 12. Consequently, the CPU 12 makes a determination result of "Yes" at step SA3 and makes a determination result of "No" at step SA4, and executes step SA5. At step SA5, the CPU 12 determines whether the command received at step SA3 is a code processing command. In this case, the determination result is "Yes" and the CPU 12 executes step SA14.

Figure 3:
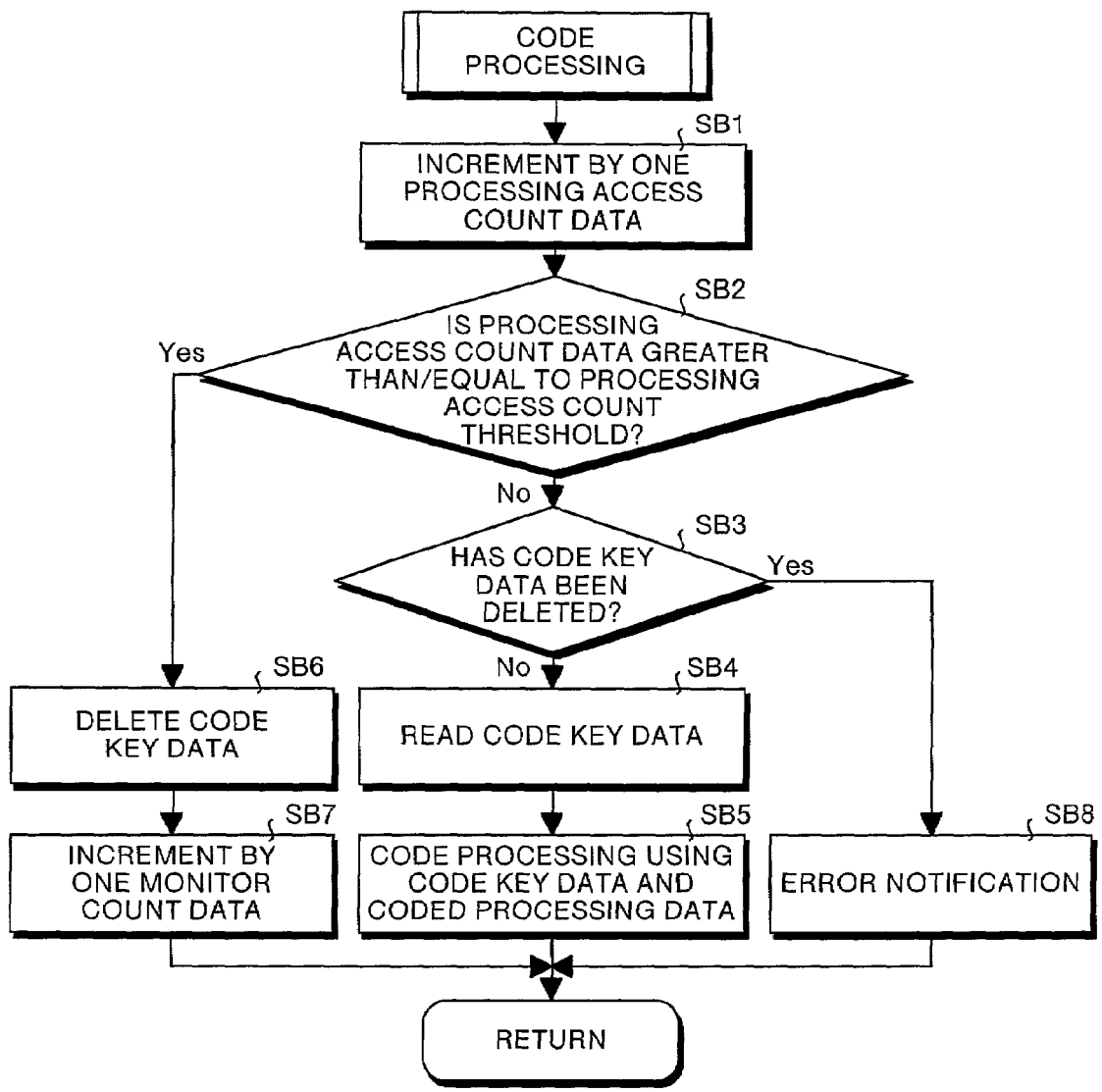
FIG. 3 is a flowchart showing code processing shown in FIG. 2.

At step SA14, the CPU 12 executes the code processing shown in FIG. 3. That is, at step SB1 shown in FIG. 3, the CPU 12 increments by one the processing access count data, stored in the processing access count data storage region 17b, and executes step SB2. At step SB2, the CPU 12 determines whether the processing access count data is at a preset processing access count threshold. This processing access count threshold is set at a value much greater than the number of processing accesses of a person who has legitimate right. That is, at step SB2, it is determined whether processing access has been performed an inordinate number of times so that an unauthorized third party may illegally obtain the secret data.

In this case, when the determination result of step SB2 is "No", the CPU 12 executes step SB3. At step SB3, the CPU 12 accesses the secret data storage region 17a and determines whether the code key data has been deleted, in this case, the determination result is "No" and the CPU 12 executes step SB4. Incidentally, when the determination result of step SB3 is "Yes", the CPU 12 executes step SB8. At step SB8, the CPU 12 executes an error process of notifying the outside apparatus via the I/F 15 that it is not possible to perform code processing, and thereafter returns to step SA2 (see FIG. 2) and repeats the operation already described above.

In this case, at step SA4, the CPU 12 reads the code key data from the secret data storage region 17a and thereafter executes step SB5. At step SB5, the CPU 12 uses the code key data and the coded processing data to perform code processing (coding and decoding), and transmits the result via the I/F 15 to the outside apparatus, thereafter, the CPU 12 returns to step SA2 (see FIG. 2) and repeats the operation described above.

On the other hand, when the determination result of step SB2 is "Yes", that is, when a third party has made an enormous number of unauthorized accesses, the CPU 12 executes step SB6. At step SB6, the CPU 12 deletes the secret data (in this case, code key data), which is stored in the secret data storage region 17a, and thereafter executes step SB7. Consequently, the unauthorized third party is prevented from illegally obtaining the secret data. At step SB7, the CPU 12 increments by one the monitor count data, which is stored in the monitor count data storage region 17c, and returns to step SA2 of FIG. 2 and repeats the operation described above.

When the outside apparatus issues a processing access count data read command to the CPU 12, the CPU 12 determines "Yes" at step SA3, "No" at step SA4, "No" at step SA5, and thereafter executes step SA6. At step SA6, the CPU 12 determines whether the command which was received at step SA3 is a processing access count data read command, in this case, the determination result is "Yes" and the CPU 12 executes step SA15.

At step SA15, the CPU 12 reads the processing access count data from the processing access count data storage region 17b, and thereafter executes step SA16. At step SA16, the CPU 12 transmits the processing access count data via the I/F 15 to the outside apparatus, and thereafter executes step SA17. At step SA17, the CPU 12 increments by one the monitor count data, which is stored in the monitor count data storage region 17c, and returns to step SA2 of FIG. 2 and repeats the operation described above.

When the outside apparatus issues a processing access count data write command to the CPU 12, and the processing access count data is transmitted to the CPU 12, the CPU 12 determines "Yes" at step SA3, "No" at step SA4, "No" at step SA5, "No" at step SA6, and thereafter executes step SA7. At step SA7, the CPU 12 determines whether the command which was received at step SA3 is a processing access count data write command, in this case, the determination result is "Yes" and the CPU 12 executes step SA18.

At step SA18, the CPU 12 writes the processing access count data in the processing access count data storage region 17b, and thereafter executes step SA19. At step SA19, the CPU 12 notifies the outside apparatus via the I/F 15 that the processing access count data has been written, and executes step SA20. At step SA20, the CPU 12 increments by one the monitor count data, which is stored in the monitor count data storage region 17c, and returns to step SA2 of FIG. 2 and repeats the operation described above.

When the outside apparatus issues a monitor count data read command to the CPU 12, the CPU 12 determines "Yes" at step SA3, "No" at step SA4, "No" at step SA5, "No" at step SA6, "No" at step SA7, and thereafter executes step SA8.

At step SA8, the CPU 12 determines whether the command which was received at step SA3 is a monitor count data read command, in this case, the determination result is "Yes" and the CPU 12 executes step SA21. Incidentally, when the determination result of step SA8 is "No", the CPU 12 executes step SA9, and notifies the outside apparatus of the fact that the command received at step SA3 is an unexecutable command via the I/F 5, and thereafter returns to step SA2 and repeats the operation described above.

In this case, at step SA21, the CPU 12 reads the monitor count data from the monitor count data storage region 17c, and thereafter executes step SA22. At step SA22, the CPU 12 transmits the monitor count data to the outside apparatus via the I/F 15, and thereafter returns to step SA2 and repeats the operation described above.

Furthermore, in the first embodiment, at the point where the processing access count data has exceeded a preset processing access count threshold, the CPU 12 (or the outside apparatus) deletes the secret data which is stored in the secret data storage region 17a. Moreover, in the first embodiment, at the point where the monitor count data has exceeded the monitor count threshold, the CPU 12 may set a flag in the data storage region 17d, and the monitor count data may be deleted by an (not-shown) outside apparatus based on this flag.

The first embodiment describes an example wherein the processing access count data storage region 17b and monitor count data storage region 17c are stored in the memory section 17, and are used as a processing access counter and monitor counter, but the processing access counter and monitor counter may be realized by registers instead. This case will be explained below as a second embodiment.

Figure 4:
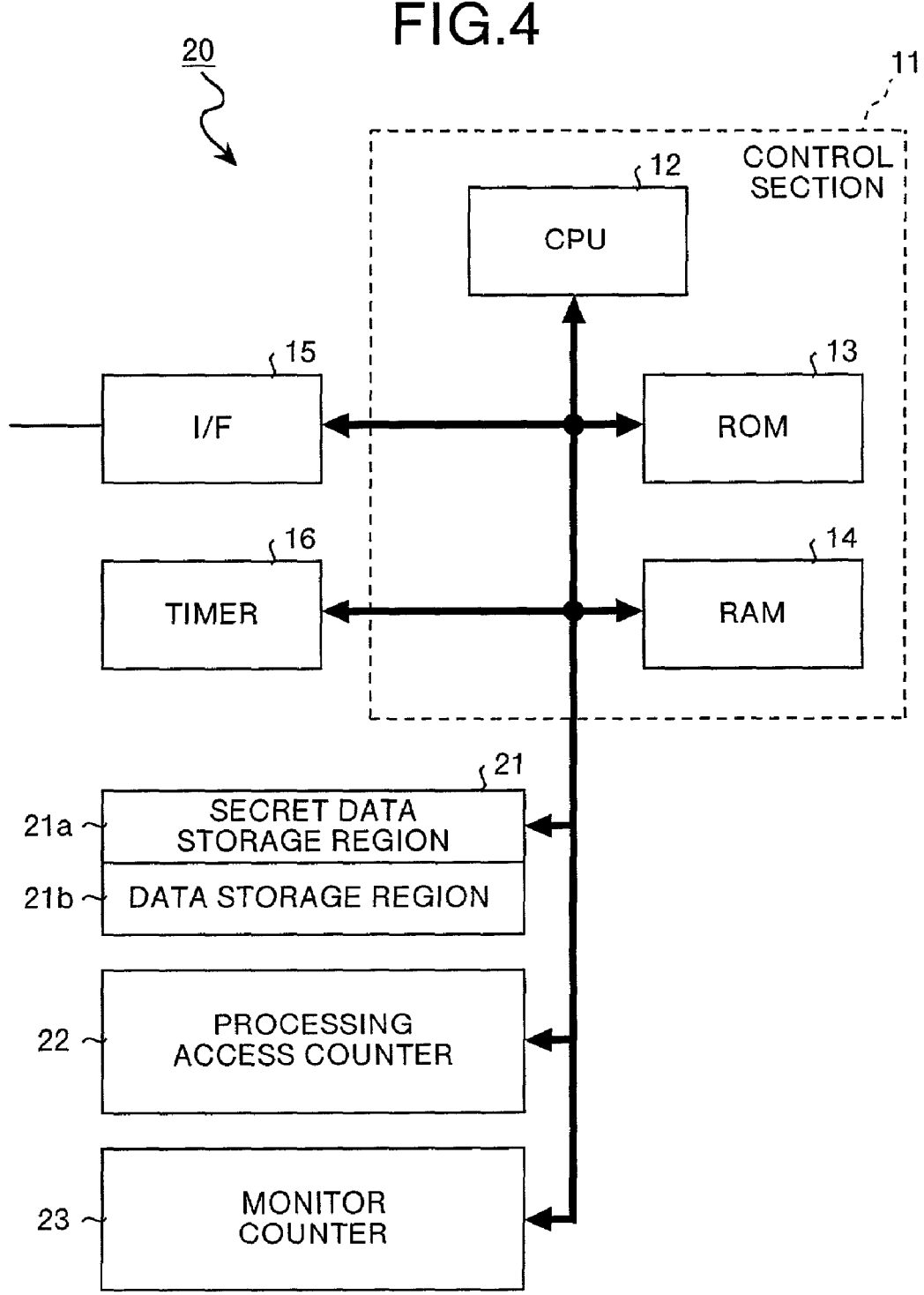
FIG. 4 is a block diagram showing the constitution of a second embodiment according to the present invention.

FIG. 4 is a block diagram showing the constitution of the second embodiment of the present invention. In the security apparatus 20 shown in FIG. 4, parts corresponding to those of FIG. 1 are represented by the same reference codes. In FIG. 4, a memory section 21, a processing access counter 22, and a monitor counter 23, are provided instead of the memory section 17 shown in FIG. 1. The memory section 21 stores secret data (e.g. code key data) and other data. Furthermore, the memory section 21 holds a secret data storage region 21a, which secret data is stored in, and a data storage region 21b, which other data are stored in. The secret data is identical to that described in the first embodiment.

The processing access counter 22 and monitor counter 23 comprise registers, and are provided independently. The processing access counter 22 and monitor counter 23 store the processing access count data and monitor count data, described in the first embodiment.

Here, in the second embodiment, the CPU 12 shown in FIG. 4 uses the addresses shown in FIG. 5 to read and write to/from the memory section 21, the processing access counter 22, and the monitor counter 23. That is, the CPU 12 uses addresses in a range of, for example, 0000H to 0FFFH, to read and write to/from the memory section 21, and to count up the processing access counter 22 (increment by one the processing access count data).

Operations of reading and writing to/from the memory section 21 include reading secret data and other data from the secret data storage region 21a and the data storage region 21b, and writing secret data and other data to the secret data storage region 21a and the data storage region 21b.

Furthermore, the CPU 12 uses the addresses in a range of, for example, 1000H to 100FH, to read and write to/from the processing access counter 22, and to count up the monitor counter 23 (increment by one the monitor count data) Operations of reading and writing to/from the processing access counter 22 include reading processing access count data from the processing access counter 22, and writing processing access count data to the processing access counter 22.

Furthermore, the CPU 12 uses the addresses in a range of, for example, 2000H to 200FH, to read from the monitor counter 23, to write to the monitor counter 23, and to delete all the data in the memory section 21. The operation of reading from the monitor counter 23 comprises reading the monitor count data from the monitor counter 23. The operation of writing to the monitor counter 23 comprises writing the monitor count data in the monitor counter 23. Deleting all the data in the memory section 21 comprises deleting the secret data which was stored in the secret data storage region 21a (and deleting the other data which was stored in the data storage region 21b ). According to this constitution, it is possible to refer to the count results of the monitor counter 22 and the monitor counter 23, and, based on these referred results, perform processing such as deleting the secret data.

Incidentally, the operation of the second embodiment is identical to the operation of the first embodiment, with the exception of the points described with reference to FIG. 5. Therefore, the effects of the second embodiment are identical to those of the first embodiment.

Figure 6:
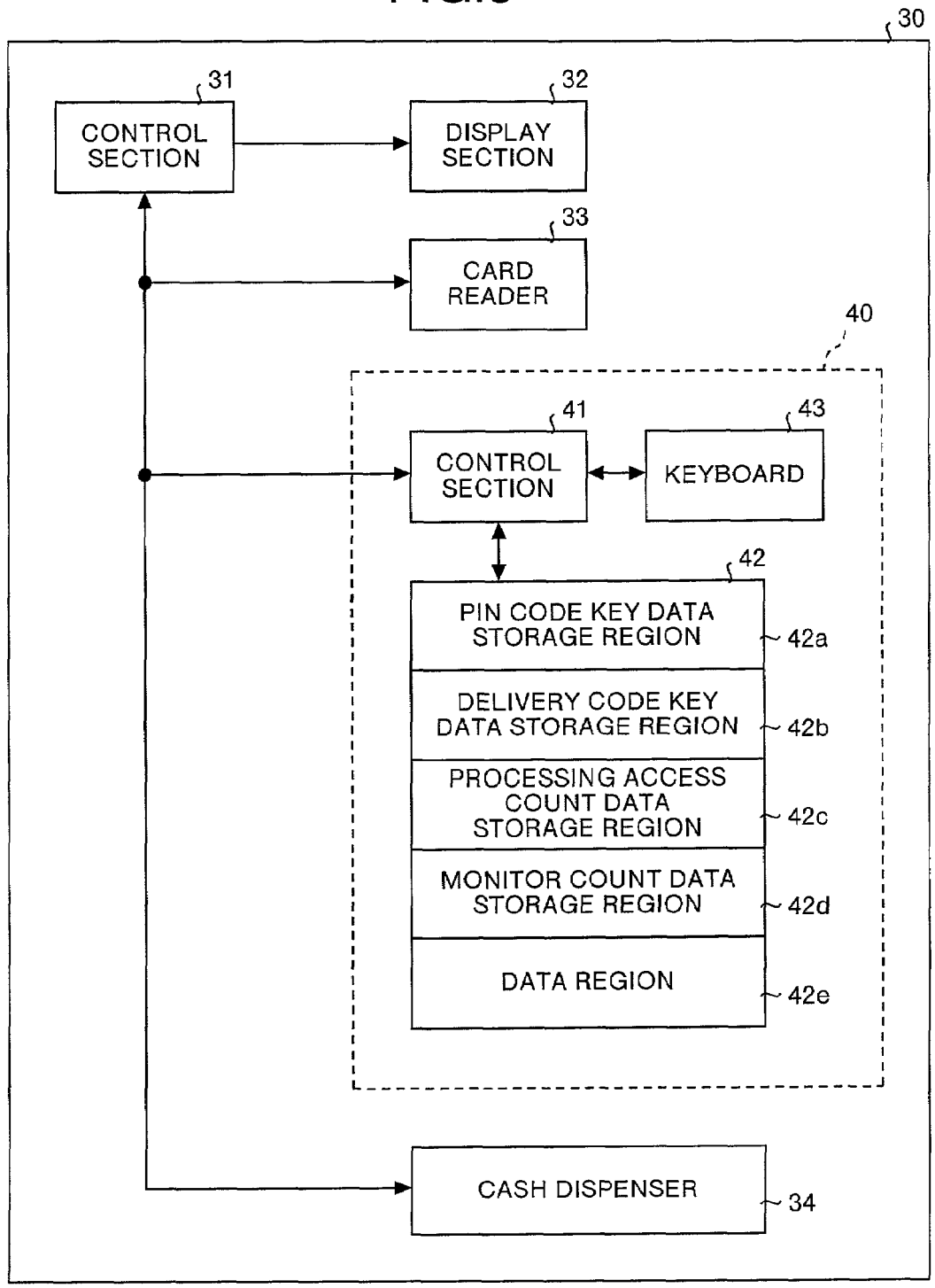
FIG. 6 is a block diagram showing the constitution of a third embodiment according to the present invention.

FIG. 6 is a block diagram showing the constitution of a third embodiment according to the present invention. An ATM (Automatic Teller Machine) 30 is shown in FIG. 6, and utilizes a security apparatus 40 which has the functions of the security apparatus 10 and security apparatus 20 already mentioned earlier. In the ATM 30, a control section 31 controls the various sections of the device, the detailed operation of this control section 31 will be explained later. A display section 32 comprises a CRT (cathode-ray tube), an LCD (liquid crystal display) or the like, and displays various types of screen to a customer. A not-shown touch panel is pasted to the display section 32.

A card reader 33 reads customer information and the like, stored in a recording section of a cash card (hereinafter simply termed "card"). A cash dispenser 34 is controlled by the control section 31, and automatically pays cash to the customer.

In the security apparatus 40, a control section 41 has the same functions as the control section 11 (see FIGS. 1 and 4), and executes various types of processing relating to the secret data in compliance with commands, input from the control section 31.

A memory section 42 stores PIN (personal identification number) code key data, delivery code key data, processing access count data, monitor count data, and other data. The PIN code key data and delivery code key data correspond to the secret data in the first and second embodiments. The PIN code key data is used as a code key when coding personal identification number data which identifies the customer as an authorized person. The delivery code key data is used as a decoding key when decoding the PIN code key data. The processing access count data and monitor count data are the same as those in the first and second embodiments.

Furthermore, the memory section 42 holds a PIN code key data storage region 42a, which the PIN code key data is stored in, a delivery code key data storage region 42b, which the delivery code key data is stored in, a processing access count data storage region 42c, which the processing access count data is stored in, a monitor count data storage region 42d, which monitor count data is stored in, and a data region 42e, which other data are stored in.

The processing access count data represents the number of accesses (processing access number) of processing relating to PIN code key data (delivery code key data) as secret data and the PIN code key data (delivery code key data) from the outside, and is incremented by one and cleared by the control section 41. That is, the processing access count data storage region 42c functions as a processing access counter which counts the processing access number under the control of the control section 41 in the same manner as the first embodiment.

Furthermore, the monitor count data is data representing the number of times some kind of processing is performed to the processing access count data (processing access counter), such as reading, writing, and updating the processing access count data. In this way, the monitor count data storage region 42d functions as a monitor counter which counts the number of times some kind of processing is carried out to the processing access count data (processing access counter) under the control of the control section 41. A keyboard 43 comprises numerical keys "0" to "9", a cancel key, and such like, and is manipulated by the customer at the time of inputting his/her personal identification number and the like.

Subsequently, the operation of the third embodiment will be explained with reference to the flowcharts shown in FIGS. 7 to 13. In the following explanation, when the power of the ATM 30 shown in FIG. 6 is switched on, processes are executed in a sequence comprising, initialization processing (step SC1)—standby processing (step SC2)—transaction processing (step SC3)—payment processing (step SC4).

Figure 7:
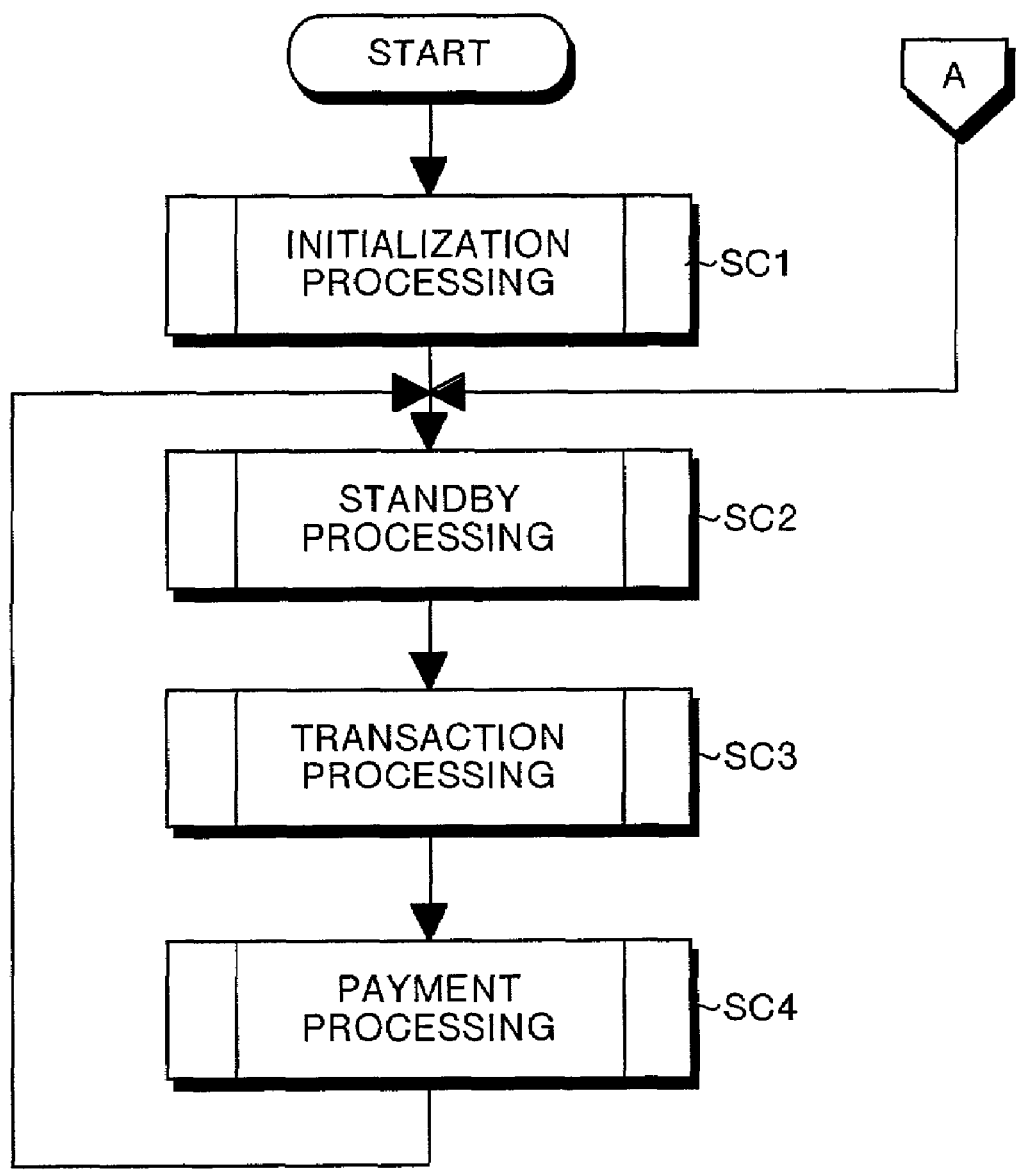
FIG. 7 is a flowchart showing the operation of the third embodiment.

That is, when the power of the ATM 30 shown in FIG. 6 is switched on, the control section 31 executes step SC1 shown in FIG. 7, and executes initialization processing (see FIG. 8) in order to set the ATM 30 to operational status.

Figure 8:
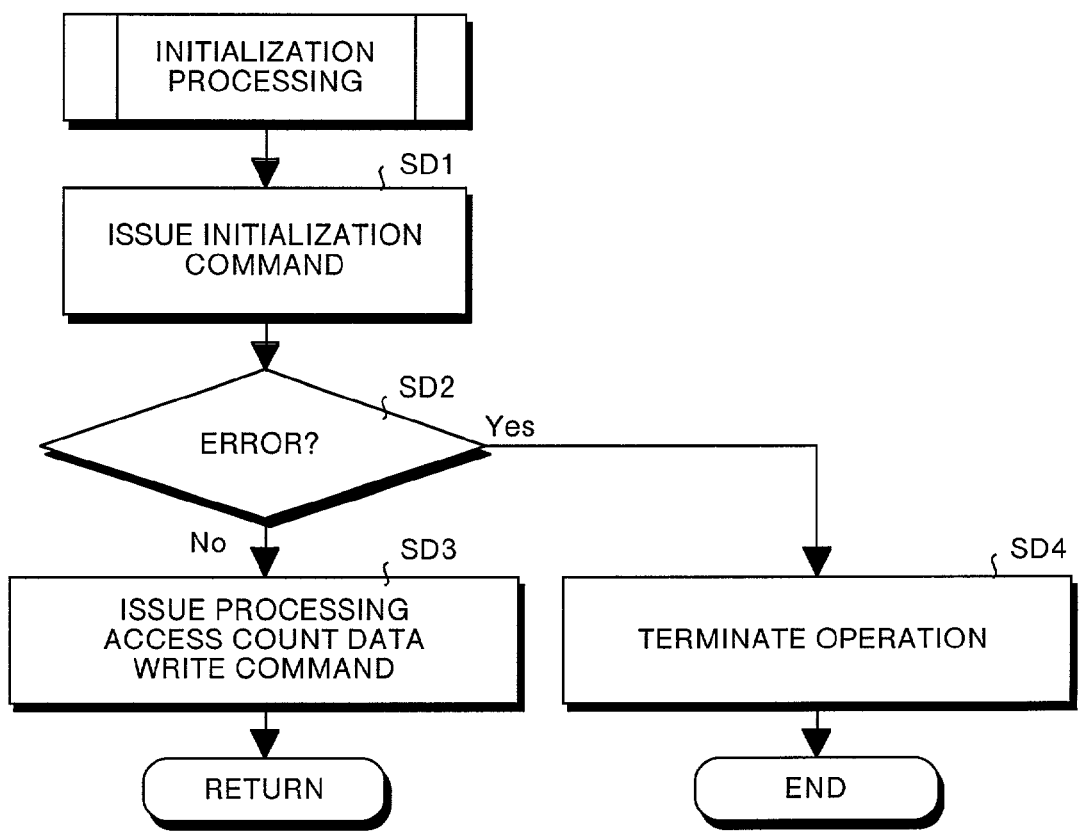
FIG. 8 is a flowchart showing initial processing shown in FIG. 7.
Figure 9:
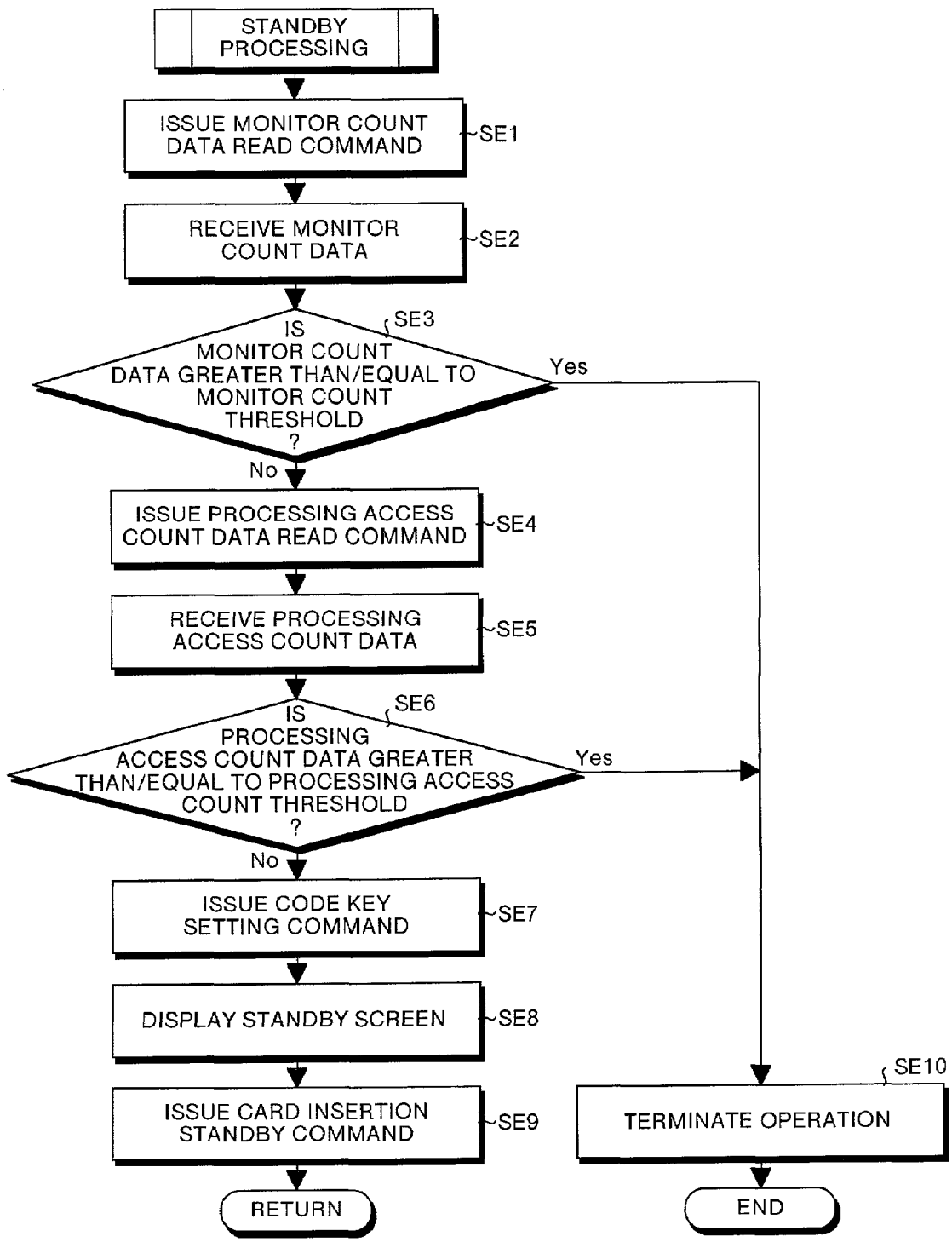
FIG. 9 is a flowchart showing standby processing shown in FIG. 7.

In the initialization processing, at step SD1 shown in FIG. 8, the control section 31 issues an initialization command to the card reader 33 and the cash dispenser 34, and executes step SD2. Consequently, the card reader 33 and the cash dispenser 34 are initialized and become operational. Incidentally, when for some reason they are not initialized, the card reader 33 and the cash dispenser 34 notify the control section 31 that an error has occurred.

At step SD2, the control section 31 determines whether an error relating to initialization has occurred, in this case, the determination result is "No" and the control section 31 executes step SD3. When the determination result of step SD2 is "Yes", the control section 31 executes step SD4 and executes processing to cancel the operation of the ATM 30, and the series of processes ends.

In this case, at step SD3, the control section 31 issues a processing access count data write command to the control section 41 of the security apparatus 40, and transmits the processing access count data (=0) to the control section 41, thereafter, the initialization processing ends and the control section 31 returns to the main routine shown in FIG. 7. Then, when the processing access count data write command and the processing access count data (=0) are received, the control section 41 writes the processing access count data (=0) in the processing access count data storage region 42c, and thereafter increments by one the monitor count data, stored in the monitor count data storage region 42d.

Subsequently, at step SC2, the control section 31 executes standby processing (see FIG. 9) to set the ATM 30 to standby status. That is, at step SE1 shown in FIG. 9, the control section 31 issues a monitor count data read command to the control section 41 of the security apparatus 40, and executes step SE2. Then, when the control section 41 receives the monitor count data read command, the control section 41 reads the monitor count data from the monitor count data storage region 42d, and transmits it to the control section 31.

Consequently, at step SE2, after receiving the monitor count data, the control section 31 executes step SE3. At step SE3, the control section 31 determines whether the monitor count data has exceeded a preset monitor count threshold. The monitor count threshold is a value used in determining whether or not a third party, who is attempting to illegally obtain secret data (PIN code key data and delivery code key data), has rewritten the processing access count data without authorization several times before reaching a processing access count threshold, explained later.

When the determination result of step SE3 is "Yes", the control section 31 deems that the processing access count data has been rewritten without authorization, and executes step SE10. At step SE10, the control section 31 executes processing to terminate the operation of the ATM 30, and thereafter the processing series ends. Consequently, the illegal obtaining of secret data by unauthorized rewriting of the processing access count data (unauthorized access of the processing access counter) is prevented.

On the other hand, when the determination result of step SE3 is "No", the control section 31 issues a processing access count data read command to the control section 41 of the security apparatus 40, and executes step SE5. Then, when the processing access count data read command is received, the control section 41 reads the processing access count data from the processing access count data storage region 42c, and transmits it to the control section 31.

Consequently, at step SE5, the control section 31 receives the processing access count data and executes step SE6. At step SE6, the control section 31 determines whether the processing access count data exceeds a preset processing access count threshold. This processing access count threshold is set at a value much greater than the number of processing accesses by a person who has a legitimate right. That is, at step SE6, it is determined whether processing access has been performed an inordinate number of times so that an unauthorized third party may illegally obtain the secret data.

When the determination result of step SE6 is "Yes", the control section 31 executes step SE10 and, after executing a process to terminate the operation of the ATM 30, the series of processes ends. Consequently, the unauthorized third party is prevented from illegally obtaining the secret data.

On the other hand, when the determination result of step SE6 is "No", the control section 31 executes step SE7. At step SE7, the control section 31 issues a code key set command to the control section 41 of the security apparatus 40, transmits the PIN code key data to the control section 41, and thereafter executes step SE8. The PIN code key data is coded by using the delivery code key data as a key. Then, when the code key set command and the PIN code key data are received, the control section 41 decodes the PIN code key data by using the delivery code key data, stored in the delivery code key data storage region 42b, as a key, and thereafter stores it in the PIN code key data storage region 42a. Furthermore, the control section 41 increments by one the processing access count data, stored in the processing access count data storage region 42c.

At step SE8, the control section 31 displays a standby screen for customer on the display section 32, and thereafter executes step SE9. At step SE9, the control section 31 issues a card insertion standby command to the card reader 33, and thereafter the processing series ends, and the control section 31 returns to the main routine shown in FIG. 7. Then, when the card insertion standby command is received, the control section 31 stands by until the customer inserts his card.

Subsequently, at step SC3 shown in FIG. 7, the control section 31 executes transaction processing (see FIG. 10) to perform an automatic transaction with the customer. That is, at step SF1 shown in FIG. 10, the control section 31 determines whether a card has been inserted to the card reader 33, and when the determination result is "No", repeats the same determination. Then, when the customer inserts the card into the card reader 33, the card reader 33 notifies the control section 31 that the card has been inserted.

As a consequence, the control section 31 determines "Yes" at step SF1, and executes step SF2. At step SF2, the control section 31 displays a personal identification number input screen which requests the customer to input his personal identification number at the display section 32, and thereafter executes step SF3 and executes PIN input processing (see FIG. 11).

Figure 11:
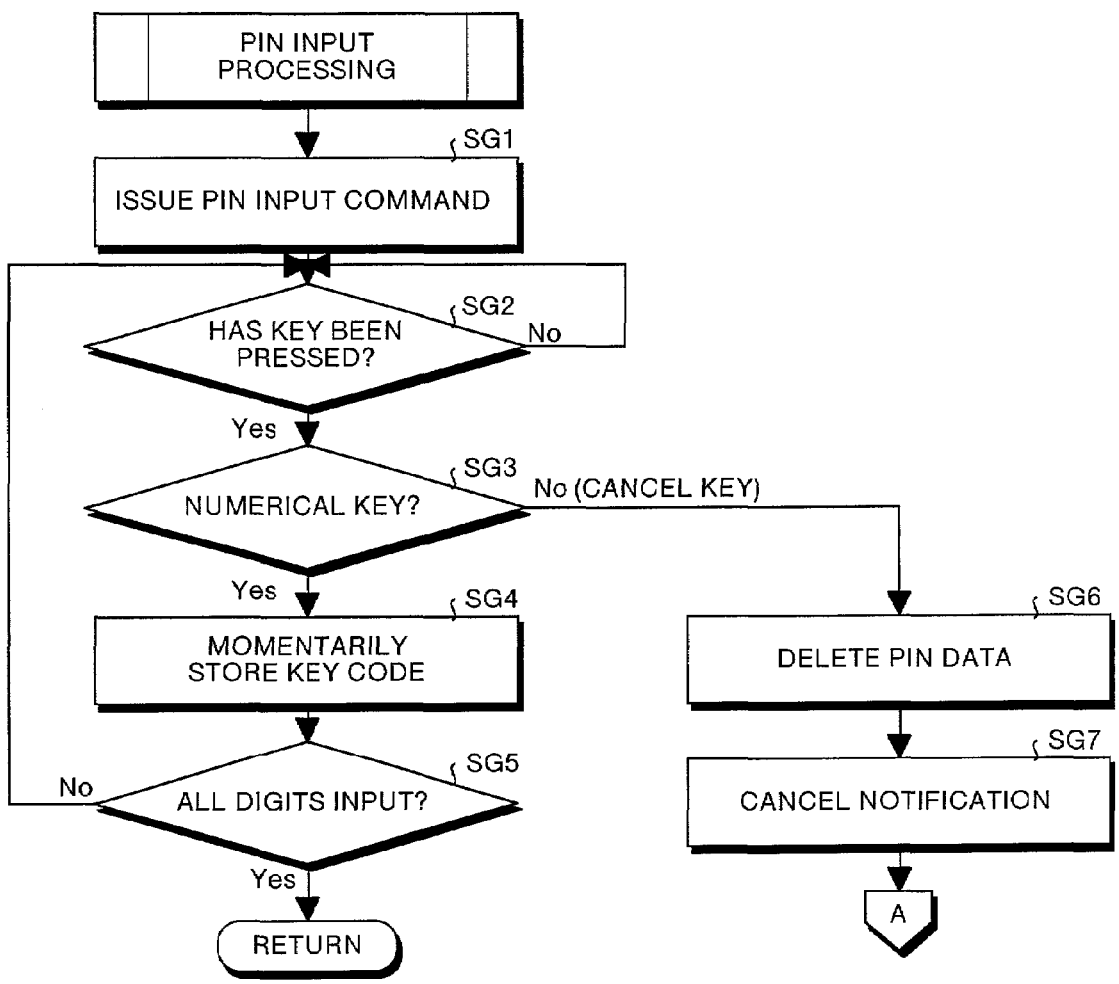
FIG. 11 is a flowchart showing PIN input processing shown in FIG. 10.

In this PIN input processing, at step SG1 shown in FIG. 11, the control section 31 issues a PIN input command to the control section 41 of the security apparatus 40. Then, when the PIN input command is received, at step SG2, the control section 41 of the security apparatus 40 determines whether or not the customer has pressed a key of the keyboard 43, when this determination result is "No", the same determination is repeated. Here, the customer inputs his personal identification number by sequentially pressing numerical keys on the keyboard 43. Consequently, the control section 41 determines "Yes" at step SG2, and executes step SG3. At step SG3, the control section 41 determines whether the pressed key is a numerical key, in this case, the determination result is "Yes" and the control section 41 executes step SG4.

At step SG4, the control section 41 momentarily stores a key code which corresponds to the numerical key as PIN (personal identification number) data in the data region 42e, and notifies the control section 31 that the personal identification number is being input, thereafter, the control section 41 executes step SG5. At step SG5, determines whether all digits (e.g. four digits) of the personal identification number have been input, in this case the determination result is "No" and the control section 41 returns to step SG2 and repeats the operation described above. Thereafter, the control section 41 momentarily stores key codes which correspond to the numerical keys, sequentially pressed by the customer, as PIN data in the data region 42e.

Then, when all the digits of the personal identification number have been input, the control section 41 determines "Yes" at step SG5, and notifies the control section 31 that all the digits of the personal identification number have been input. Consequently, after the series of PIN input processing has ended, the control section 31 returns to the main routine shown in FIG. 10.

Furthermore, in the PIN input processing, when the customer has pressed the cancel key of the keyboard 43, the control section 41 determines "No" at step SG3 and executes step SG6. At step SG6, the control section 41 deletes the PIN data stored in the data storage region 42e, and executes step SG7. At step SG7, the control section 41 notifies the control section 31 that the input personal identification number has been cancelled. As a consequence, the control section 31 returns to step SC2 shown in FIG. 7, and repeats the operation described above.

Figure 10:
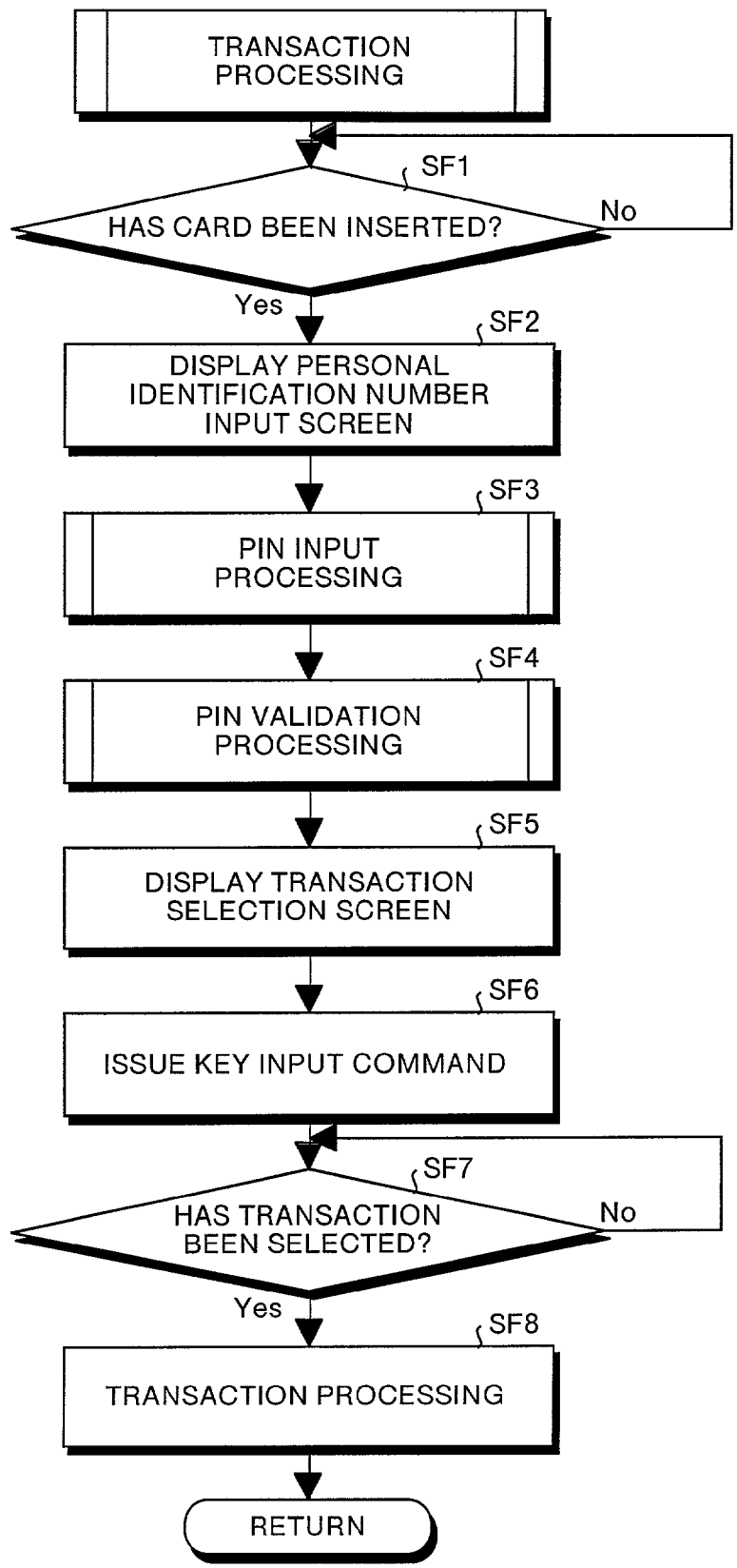
FIG. 10 is a flowchart showing transaction processing shown in FIG. 7.

At step SF4 shown in FIG. 10, the control section 31 executes PIN validation processing (see FIG. 12). That is, in the PIN validation processing, at step SH1 shown in FIG. 12, the control section 31 issues a PIN block command to the control section 41 of the security apparatus 40. Then, when the PIN block command is received, at step SH2, the control section 41 of the security apparatus 40 reads the PIN (personal identification number) data stored in the data storage region 42e, and, in compliance with the PIN data and the command parameters, creates a PIN block which is stipulated by ISO (International Organization for Standardization) 9564-1, and thereafter executes step SH3.

At step SH3, the control section 41 reads the PIN code key data from the PIN code key data storage region 42a, codes the PIN block by using this as a key, and thereafter executes step SH4. At step SH4, the control section 41 transmits the coded PIN block to the control section 31, and executes step SH5. At step SH5, the control section 41 increments by one the processing access count data stored in the processing access count data storage region 42c, and executes step SH6.

At step SH6, the control section 41 deletes the PIN data stored in the data storage region 42e. Then, when the above coded PIN block is received, at step SH7, the control section 31 determines whether a value calculated beforehand matches the PIN block.

When the determination result of step SH7 is "Yes", the control section 31 confirms that the personal identification number input by the customer is the correct number, and thereafter the series of PIN validation processing ends, and the control section 31 returns to step SF5 of FIG. 10. On the other hand, when the determination result of step SH7 is "No", the control section 31 confirms that the personal identification number input by the customer is an incorrect number, and executes step SH8. At step SH8, the control section 31 carries out an error process of displaying an input error screen or the like at the display section 32, and returns to step SC2 shown in FIG. 7, and repeats the operation described above.

In this case, at step SF5 shown in FIG. 10, the control section 31 displays a transaction selection screen at the display section 32, and executes step SF6. The transaction selection screen is a screen which allows the customer to select a desired transaction from payment, receipt, transfer, and the like. At step SF6, the control section 31 issues a key input command to the control section 41 of the security apparatus 40, and executes step SF7. Then, the control section 41 receives the key input command and, when the customer has pressed a key on the keyboard 43 which corresponds to transaction in the above transaction selection screen, the control section 41 transmits a key code relating to the key to the control section 31.

At step SF7, the control section 31 determines, based on the key code from the control section 41, whether transaction has been selected in the transaction selection screen, in this case, the determination result is "No" and the control section 31 repeats the above operation. Then, after the key which correspond to payment as the transaction, following when the customer presses a key which correspond to a withdrawal amount (e.g. one-hundred dollars), the control section 31 determines "Yes" at step SF7, and executes step SF8. At step SF8, the control section 31 executes a process of starting the selected transaction, and thereafter the series of transaction processes ends, and the control section 31 executes step SC4 shown in FIG. 7.

At step SC4 shown in FIG. 7, the control section 31 executes payment processing (see FIG. 13). That is, at step SI1 shown in FIG. 13, the control section 31 issues a payment command of paying out one-hundred dollars in cash, as specified by the customer, to the cash dispenser 34, and executes step SI2. Then, when the payment command is received, the cash dispenser 34 pays out one hundred dollars in cash to the customer. At step SI2, the control section 31 displays a payment screen comprising information for the customer relating to cash counting, paying-out, and cash extracting on the display section 32, and thereafter executes step SI3.

At step SI3, the control section 31 determines whether the customer has extracted the cash, and when the determination result is "No", repeats the above operation. Then, when the customer has extracted the cash, the control section 31 determines a result of "Yes" at step SI3 and executes step SI4. At step SI4, the control section 31 issues a repayment command to the card reader 33, and thereafter the series of processes ends, and the control section 31 returns to step SC2 shown in FIG. 7 and repeats the operation above.

Here, in the payment processing described above, since the security apparatus 40 is not being used, there is a possibility that an unauthorized processing access has been performed to the security apparatus 40 by, for example, updating the program used by the control section 31, and connecting another control circuit to an interface (not-shown) between the control section 41 and the control section 31.

However, in the third embodiment, even when there has been an unauthorized processing access, the processing access count data stored in the processing access count data storage region 42c is incremented by one as described above, and the monitor count data stored in the monitor count data storage region 42d is incremented by one. Therefore, the fact that there has been an unauthorized processing access during payment processing remains in the processing access count data and the monitor count data. Consequently, since the fact that there has been an unauthorized processing access is discovered at step SE3 and step SE6 in the standby processing (see FIG. 9), the security apparatus 40 can maintain an even higher level of security.

The specific constitution examples of the present invention are not restricted to the first to third embodiments, described above with reference to the accompanying drawings, and various modifications to the design and the like may be made without deviating from the scope of the main features of the invention. For example, in the first to third embodiments described above, security programs which realizes the functions of the security apparatus 10, the security apparatus 20, and the security apparatus 40 (ATM 30), may be stored in a computer-readable recording medium, the programs stored in this recording medium are read and executed by a computer, thereby realizing the security functions.

The recording medium may comprise a portable recording medium such as an optical disk, a floppy disk, a hard disk, and an IC card, or a transmitting medium which stores data momentarily in the manner of a network Furthermore, although the first to third embodiments can be applied independently, they may be combined in multiple.

As described above, according to the first to third embodiments, the number of times that processing access count data is updated is counted as monitor count data, and the processing of secret data is restricted based on this monitor count data, therefore, security relating to the illegal obtaining of the secret data can be increased more than in conventional apparatuses.

Further, according to the first to third embodiments, the secret data, which is the target of, illegal obtaining, is deleted when the processing access count data has exceeded a processing access count threshold, therefore, security relating to the illegal obtaining of the secret data can be increased still further than in conventional apparatuses.

Further, according to the first to third embodiments, the secret data, which is the target of illegal obtaining, is deleted when the monitor count data has exceeded the monitor count threshold, therefore, security relating to the illegal obtaining of the secret data can be increased still further than in conventional apparatuses.

Further, according to the first embodiment, the CPU 12 clears the processing access count data at predetermined time intervals based on the count result of the timer 16, therefore, when the number of processes relating to the secret data by a person having legitimate right has exceeded the processing access count threshold, the unnecessary deletion of secret data can be avoided.

As described above, according to the present invention, in addition to a first counting unit, a second counting unit which counts the number of times the first counter value is updated is provided, and, based on the second count result of the second counting unit, processing relating to secret data is restricted, therefore, security relating to the illegal obtaining of the secret data can be increased more than in conventional apparatuses.

Further, according to the present invention, a first restricting unit deletes the secret data, which is the target of illegal obtaining, therefore, security relating to the illegally obtaining of the secret data can be increased more than in conventional apparatuses.

Further, according to the present invention, a second restricting unit deletes the secret data, which is the target of an illegal access, therefore, security relating to the illegally obtaining of the secret data can be increased more than in conventional apparatuses.

Further, according to the present invention, a clearing unit clears the first count result at predetermined time intervals, therefore, when the number of processes relating to the secret data by a person having legitimate right has exceeded the first threshold, the unnecessary deletion of secret data can be avoided.

Further, according to the present invention, in addition to a first counting step, a second counting step of counting the number of times a first counter value is updated is provided, and, based on the second count result of the second counting step, processing relating to secret data is restricted, therefore, security relating to the illegally obtaining of the secret data can be increased more than in conventional apparatuses.

INDUSTRIAL APPLICABILITY

As described above, the security apparatus and computer-readable recording medium, which security programs are stored in, according to the present invention are useful when there is a need for high security relating to secret data.

The invention claimed is:

1. A security system used in an apparatus which deals with secret data, comprising:
a storage medium which stores the secret data;
a first counting unit which counts a number of processing accesses relating to the secret data, the processing accesses including legal accesses due to requests from the apparatus and illegal accesses by an attacker or from an external apparatus other than said apparatus;

a first restricting unit which restricts subsequent processing when a first count result of the first counting unit has exceeded a preset first count threshold value;

a second counting unit which counts the number of times a first count result set by the first counting unit is accessed regardless of legality of each access to the first count result; and a second restricting unit which restricts subsequent processing when a second count result of the second counting unit has exceeded a preset second count threshold value which just exceeds an estimated number of possible accesses given to the first count result at requests of said apparatus.

2. The security system according to claim 1, wherein the first restricting unit deletes the secret data, stored in the storage medium, when the first count result has exceeded a preset first threshold value.

3. The security system according to claim 1, wherein the second restricting unit deletes the secret data, stored in the storage medium, when the second count result has exceeded a preset second threshold value.

4. The security system according to claim 2, further comprising a clearing unit which clears the first count result at predetermined time intervals.

5. A computer-readable recording medium, which a security program is stored in to allow a computer used in an apparatus which deals with secret data to execute:

a storing step of storing secret data;

a first counting step of counting a number of processing accesses relating to the secret data to the processing accesses including legal accesses due to requests from the apparatus and illegal accesses by an attacker or from an external apparatus other than said apparatus;

a first restricting step of restricting subsequent processing when a first count value of the first counting step has exceeded a preset first count threshold value;

a second counting step of counting the number of times a first count result set by the first counting unit is accessed regardless of legality of each access to the first count result; and a second restricting step of restricting subsequent processing when a second count result of the second counting step has exceeded a preset second count threshold value which just exceeds an estimated number of possible accesses given to the first count result at requests of said apparatus.

6. The security system according to claim 1 and provided only for the first count result with a setting unit, responsive to a predetermined command from said apparatus, for setting the first count result for a value associated with the predetermined command, whereby the second count result cannot be updated from the outside.

7. An apparatus which deals with secret data, comprising:

a controller for controlling an entirety of the apparatus;

resources which operate under control of the controller to realize functions the apparatus is supposed to provide; and a security system comprising:

a storage medium which stores the secret data;

a first counting unit which counts a number of processing accesses relating to the secret data, the processing accesses including legal accesses due to requests from the apparatus and illegal accesses by an attacker or from an external apparatus other than said apparatus;

a first restricting unit which restricts subsequent processing when a first count result of the first counting unit has exceeded a preset first count threshold value;

a second counting unit which counts the number of times a first count result set by the first counting unit is accessed regardless of legality of each access to the first count result; and a second restricting unit which restricts subsequent processing when a second count result of the second counting unit has exceeded a preset second count threshold value which just exceeds an estimated number of possible accesses given to the first count result at requests of said apparatus.

* * * * *